(12) United States Patent
Meyer et al.

(10) Patent No.: US 12,698,032 B2
(45) Date of Patent: Aug. 4, 2026

(54) STEER-BY-WIRE ROAD WHEEL ACTUATOR DITHER TO IMPROVE RACK FORCE ESTIMATION

(71) Applicant: Steering Solutions IP Holding Corporation, Saginaw, MI (US)

(72) Inventors: Jeffrey R. Meyer, Munger, MI (US); Michael A. Eickholt, Chesaning, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 61 days.

(21) Appl. No.: 18/813,210

(22) Filed: Aug. 23, 2024

(65) Prior Publication Data

US 2025/0065948 A1 Feb. 27, 2025

Related U.S. Application Data

(60) Provisional application No. 63/534,148, filed on Aug. 23, 2023.

(51) Int. Cl.
B62D 6/00 (2006.01)
B62D 5/00 (2006.01)

(52) U.S. Cl.
CPC ............. B62D 6/008 (2013.01); B62D 5/006 (2013.01)

(58) Field of Classification Search
CPC ............... B60W 40/06; B60W 40/068; B60W 2510/202; B60W 2520/10; B60W 2050/0031; B60W 2540/18; B60W 2756/10; B62D 5/046
See application file for complete search history.

(56) References Cited

U.S. PATENT DOCUMENTS

| | | | | |
|---|---|---|---|---|
| 6,176,341 | B1 * | 1/2001 | Ansari | ................... B62D 6/008 |
| | | | | 180/402 |
| 6,262,547 | B1 | 7/2001 | Kifuku | |
| 6,744,232 | B2 | 6/2004 | Endo | |
| 9,327,762 | B2 | 5/2016 | Oblizajek | |

(Continued)

FOREIGN PATENT DOCUMENTS

| | | |
|---|---|---|
| CN | 108248628 A | 7/2018 |
| CN | 111572631 A | 8/2020 |

(Continued)

OTHER PUBLICATIONS

Behera, R. K., and S. P. Das. "Improved direct torque control of induction motor with dither injection." Sadhana 33 (2008): 551-564.

(Continued)

*Primary Examiner* — Hai H Huynh
*Assistant Examiner* — Johnny H Hoang
(74) *Attorney, Agent, or Firm* — Dickinson Wright PLLC

(57) ABSTRACT

A method for controlling a motor of a road wheel actuator (RWA) in a steer-by-wire (SbW) steering system of a vehicle includes providing a motor torque command signal to the motor, providing a dithering signal to the motor such that the dithering signal is applied to the motor torque command signal, the dithering signal being configured to allow road disturbances to cause movement of a rack bar of the SbW steering system, sensing the road disturbances, and generating an emulation signal based on the sensed road disturbances.

18 Claims, 4 Drawing Sheets

(56)          References Cited

U.S. PATENT DOCUMENTS

|  |  |  |  |  |
|---|---|---|---|---|
| 9,574,972 | B2 | 2/2017 | Oblizajek | |
| 11,447,175 | B2 | 9/2022 | Collier-Hallman | |
| 11,851,121 | B2 | 12/2023 | Kim | |
| 11,897,479 | B2 | 2/2024 | Beal | |
| 2003/0220727 | A1* | 11/2003 | Husain | B62D 6/008 |
|  |  |  |  | 180/443 |
| 2004/0148077 | A1* | 7/2004 | Yasui | B60W 40/101 |
|  |  |  |  | 701/41 |
| 2004/0267424 | A1* | 12/2004 | Yao | B62D 5/003 |
|  |  |  |  | 180/443 |
| 2005/0230180 | A1* | 10/2005 | Kodama | B62D 5/046 |
|  |  |  |  | 180/446 |
| 2011/0120797 | A1* | 5/2011 | Kitahata | B62D 5/04 |
|  |  |  |  | 180/443 |
| 2013/0299270 | A1 | 11/2013 | Oblizajek | |
| 2020/0023893 | A1* | 1/2020 | Naik | B62D 5/0466 |
| 2020/0023894 | A1* | 1/2020 | Naik | B62D 6/008 |

FOREIGN PATENT DOCUMENTS

| | | | |
|---|---|---|---|
| DE | 102005005315 | A1 | 1/2006 |
| DE | 102007039885 | A1 | 3/2008 |
| DE | 102008048419 | B4 | 7/2015 |
| EP | 1849682 | A1 | 10/2007 |
| EP | 1683706 | B1 | 8/2009 |
| JP | 5489896 | B2 | 5/2014 |
| JP | 7303044 | B2 | 7/2023 |

OTHER PUBLICATIONS

Pramod, Prerit. "Position Sensing Errors in Synchronous Motor Drives." arXiv preprint arXiv:2310.00977 (2023), 16 pages.

* cited by examiner

300

304 — DETERMINE CHARACTERISTICS OF DITHERING SIGNAL TO APPLY TO RWA

308 — GENERATING AND APPLYING DITHERING SIGNAL TO RWA

312 — DETERMINE EFFECTS OF ROAD FEATURES EXPERIENCED BY THE RWA

316 — GENERATE EMULATION SIGNAL BASED ON DETERMINED EFFECTS OF ROAD FEATURES

320 — APPLY EMULATION SIGNAL TO HWA

STEER-BY-WIRE ROAD WHEEL ACTUATOR DITHER TO IMPROVE RACK FORCE ESTIMATION

CROSS-REFERENCE TO RELATED APPLICATIONS

This application claims the benefit of U.S. Provisional Application No. 63/534,148, filed on Aug. 23, 2023. The entire disclosure of the applications referenced above is incorporated herein by reference.

TECHNICAL FIELD

This disclosure relates to control of components in steer-by-wire (SbW) steering systems.

BACKGROUND OF THE INVENTION

A vehicle, such as a car, truck, sport utility vehicle, crossover, minivan, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

SUMMARY

This disclosure relates generally to control of steer-by-wire (SbW) steering systems.

An aspect of the disclosed embodiments includes a method for controlling a motor of a road wheel actuator (RWA) in a steer-by-wire (SbW) steering system of a vehicle. The method includes providing a motor torque command signal to the motor, providing a dithering signal to the motor such that the dithering signal is applied to the motor torque command signal, the dithering signal being configured to allow road disturbances to cause movement of a rack bar of the SbW steering system, sensing the road disturbances, and generating an emulation signal based on the sensed road disturbances.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
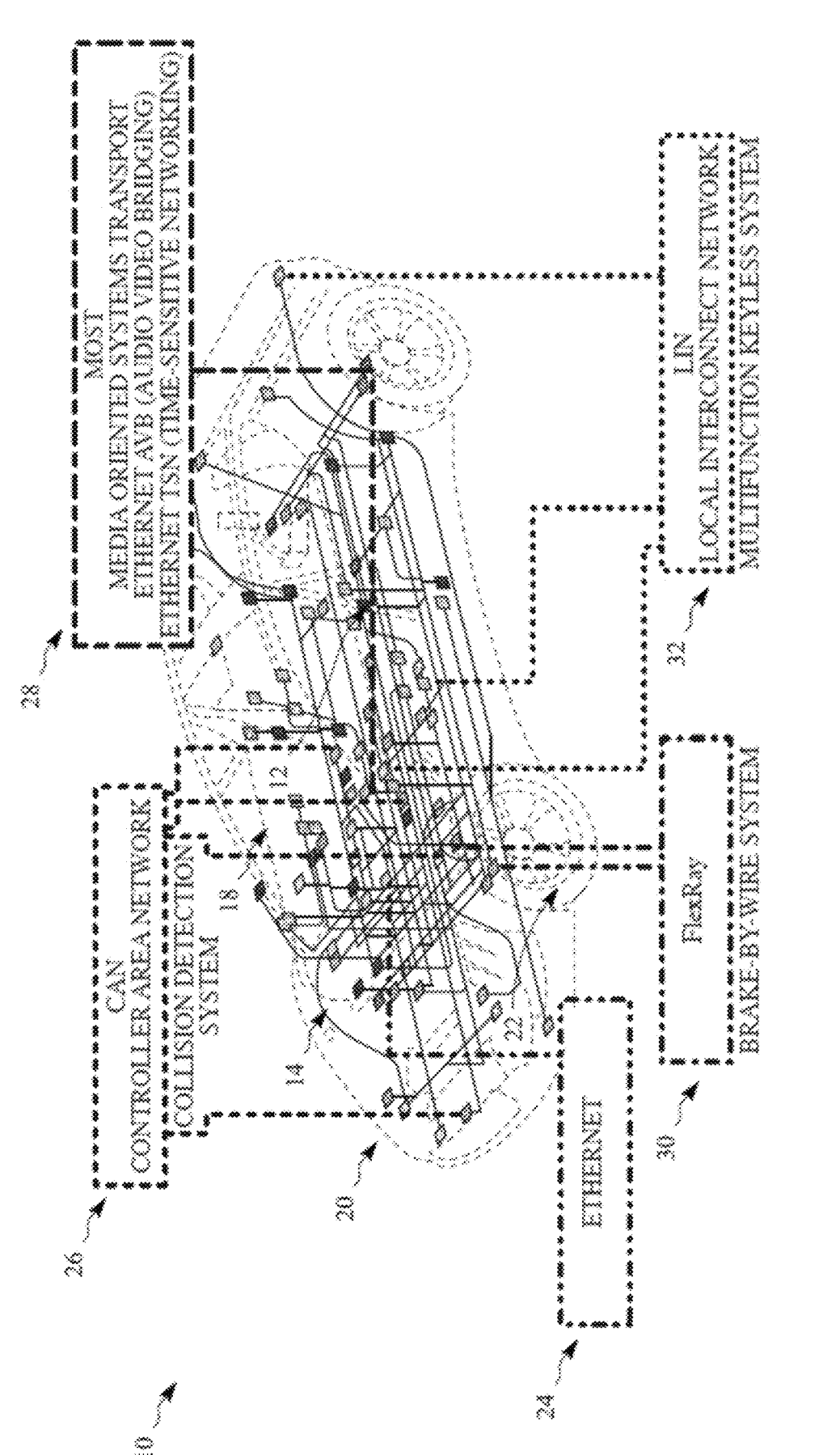
FIG. 1A generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, minivan, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

In steer-by-wire (SbW) steering systems, many functions rely on an accurate measurement or estimation of force at the steering rack. The systems that rely on estimation typically use a model-based observer (e.g., sensors and other circuitry) to predict rack force. This observer relies on signals from the motor and controller. Friction acts as a disturbance to this method of rack force estimation. The observer cannot tell the difference between rack force and friction because they must both be overcome by the motor and the observer uses this info to calculate rack force. Even if the observer is able to determine the difference between rack force and friction, road feedback inputs to a road wheel actuator (RWA) must overcome the system friction and move the motor prior to being measured/determined by the motor and transmitted to the handwheel actuator for emulation.

Accordingly, systems and methods according to the present disclosure are configured to reduce the static friction of the RWA by maintaining the system in a dynamic state. For example, a dithering signal is applied to the RWA (e.g., overlaying a motor torque command signal) to overcome the static friction. This allows for lower friction to be observed, creates improved rack force estimation, and provides improved road feedback by allowing the RWA to respond to road disturbances.

Some systems may apply a dithering signal to a handwheel actuator (HWA). For example, it may not be desirable for some types of road or vehicle disturbances to be transferred to the handwheel and felt by the driver. Such disturbances may include, but are not limited to, road shake, vibration or other repeated, periodic disturbances caused by vehicle mechanical flaws or defects, misalignments, etc. The dithering signal applied to the HWA may be configured to reduce or eliminate the effects of these disturbances such that these disturbances are not conveyed to the driver via the handwheel. For example, periodic or repeated disturbances (such as those caused by road shake) may be sensed/measured, and a frequency and amplitude of the dithering signal applied to the HWA may be dynamically adjusted based on the sensed disturbances to cancel out any detectable disturbance at the handwheel. In contrast, systems and methods according to the present disclosure apply a dithering signal having a predetermined or calibrated frequency and amplitude to the RWA to overcome static friction associated with the RWA and related components of the steering system. In this manner, "desirable" road disturbances (i.e., features of the road that may improve driving "feel" when conveyed to the driver) can be measured and emulated and then conveyed to the driver.

FIG. 1A generally illustrates a vehicle 10 according to the principles of the present disclosure. The vehicle 10 may include any suitable vehicle, such as a car, a truck, a sport utility vehicle, a minivan, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media-oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steer-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more road wheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10. The steering system of the present disclosure is configured to implement RWA dither as described below in more detail.

Figure 1B:
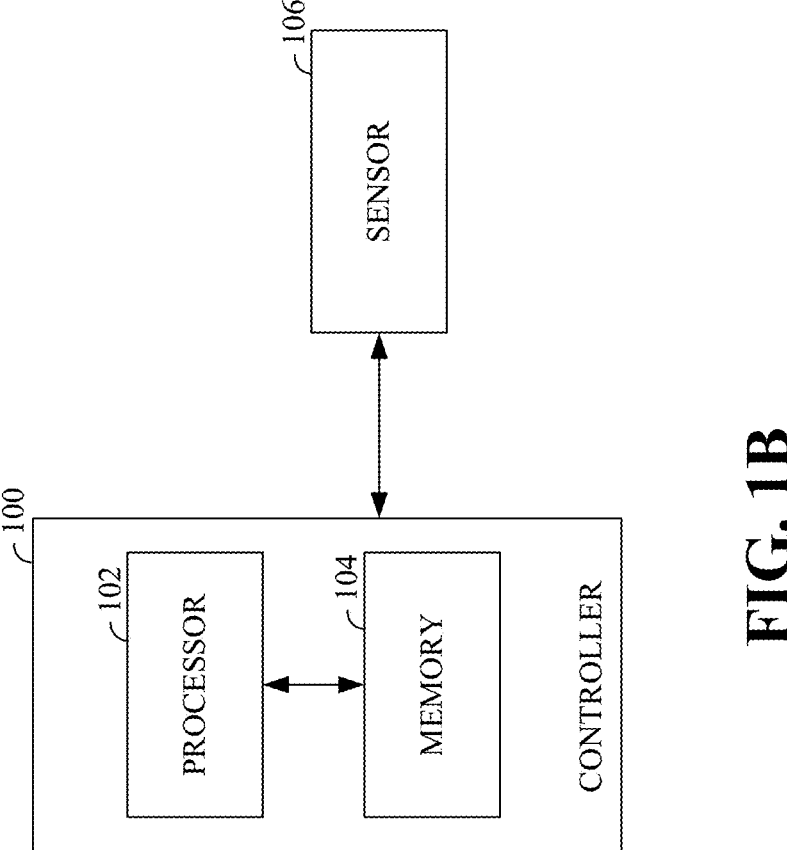
FIG. 1B generally illustrates a controller according to the principles of the present disclosure.

In some embodiments, the vehicle 10 includes one or more controllers, such as controller 100, as is generally illustrated in FIG. 1B. The controller 100 may correspond to a steering system controller. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to perform functions associated with the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

As used herein, "controller" may refer to a hardware module or assembly including one or more processors or microcontrollers, memory, sensors, one or more actuators, a communication interface, etc., any portions of which may be collectively referred to as "circuitry." As described herein, respective functions and steps performed by a given controller, control circuitry, etc. may be collectively performed by multiple controllers, processors, etc. For example, a processor, processing device, controller, control circuitry, etc. "configured to perform" may refer to a single processor, processing device, controller, etc. configured to perform both A and B or may refer to a first processor, processing device, controller, etc. configured to perform A and a second processor, processing device, controller, etc. configured to perform B. For simplicity, "control circuitry configured to perform A and B" may refer to a single or multiple processors, processing devices, controllers, etc. collectively configured to perform A and B.

In some embodiments, the controller 100 may perform the methods described herein. However, the methods described herein as performed by the controller 100 are not meant to be limiting, and any type of software executed on a controller, processor, or other circuitry can implement RWA dithering functions as described herein without departing from the scope of this disclosure. For example, a controller, such as a processor executing software within a computing device, can implement the systems and methods described herein.

RWA dithering systems and methods according to the present disclosure are configured to continuously and dynamically dither the RWA (e.g., a motor of the RWA, referred to herein as an RWA motor, which may be used herein interchangeably with "RWA") at a calibratable frequency and amplitude (e.g., using an excitation waveform). Frequency is chosen as high as possible without creating an audible noise. Amplitude is chosen as high as possible while still causing little to no motion of the rack bar. The excitation waveform could be any periodic shape, such as square wave, triangle wave, sinusoidal, etc.

As an example, a dithering (or dither) command or signal according to the present disclosure is simply an overlay on the actual motor torque command provided to the RWA motor. By dithering the RWA motor, the static friction of the system is no longer present. Accordingly, only dynamic friction must be overcome in order to cause the system to move. This allows for more accurate rack force estimation and improved road feel because road disturbances will more easily move the rack bar. The motor will then have to be controlled to counteract this movement to maintain a desired position. The observer (e.g., one or more sensors, a controller or processor executing instructions, etc.) will be able to measure these disturbances and transmit a signal indicative of the disturbances to the handwheel actuator to emulate.

In this manner, dithering the RWA motor dithers the EPS system and eliminates low frequency friction properties, such as static friction. Eliminating or minimizing lower frequency friction properties improves two key characteristics: (i) rack force estimation, due to friction being a smaller disturbance to the total rack force observation by the motor; and (ii) road feel, by reducing the amount of friction for the road disturbances to overcome to move the rack bar. This in turn requires adjustments to motor torque to maintain a desired position. Accordingly, the required motor torque will be passed to the observer and measured as a disturbance force. Information indicative of the disturbance force can then be passed to the handwheel actuator to be emulated. In other words, the dithering techniques described herein are configured to allow road disturbances to move the rack bar and therefore improve road feel, not to eliminate vibration caused by road disturbances.

Figure 2:
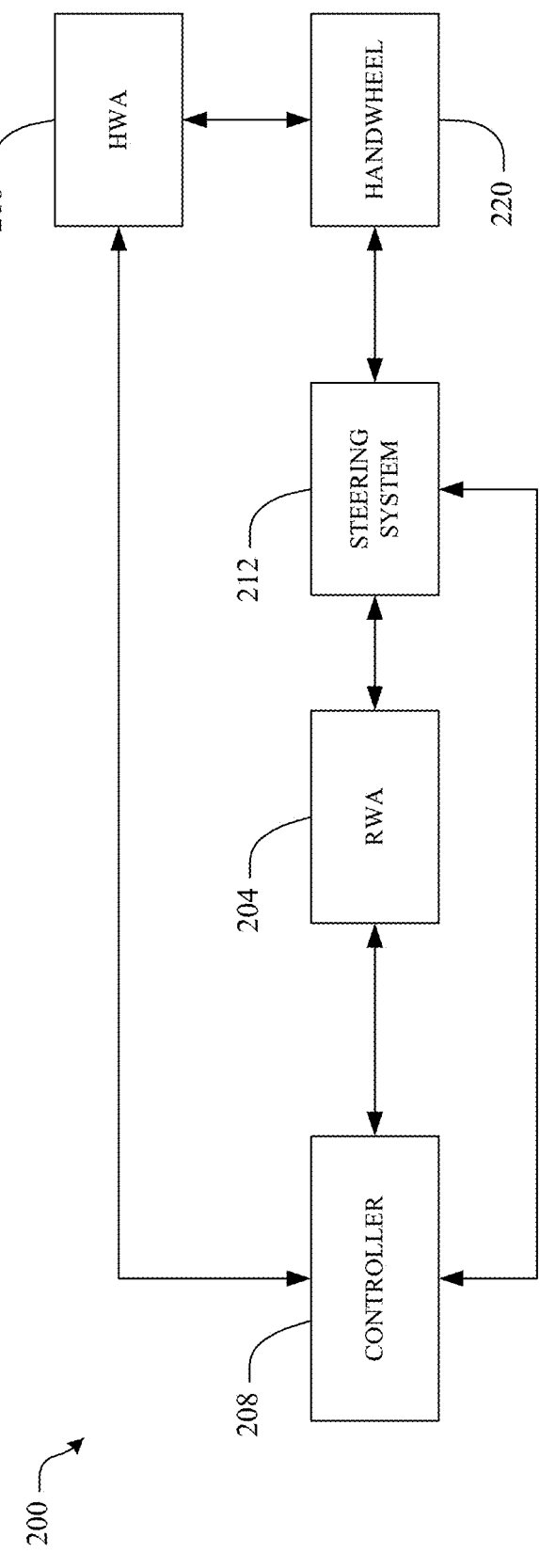
FIG. 2 shows an example system configured to control a road wheel actuator according to the principles of the present disclosure.

FIG. 2 shows an example system 200 configured to control an RWA 204 (e.g., an RWA, RWA motor, etc. of a SbW system) according to the present disclosure, as described above. For example, a controller 208 (e.g., a controller implemented in a manner as described in FIG. 1B) is configured to provide a dithering command or signal to dither the RWA 204 (e.g., by applying the dithering signal described above to a motor torque command provided to the RWA 204) and minimize/eliminate static friction of a steering system 212. Controlling the RWA 204 (e.g., rotating an RWA motor) causes linear motion to be transferred to the steering system 212 to turn the road wheels of a vehicle.

For example, the controller 208 is configured to provide the dithering signal at a calibratable frequency (e.g., a frequency selected to be as high as possible without creating an audible noise or other disturbance detectable by a driver) and amplitude (e.g., an amplitude selected to be as high as possible while causing little to no motion of the rack bar of the steering system 212). The dithering signal corresponds to a periodic excitation waveform, such as a square wave, a triangle wave, a sinusoidal signal, etc.

By dithering the RWA 204 (e.g., a motor of the RWA 204) in this manner, effects of static friction of the steering system 212 are reduced or eliminated and only dynamic friction must be overcome (i.e., by road disturbances) in order to cause movement of various components of the steering system 212 (e.g., the rack bar). Accordingly, road disturbances will more easily move the rack bar. The controller 208 controls the RWA 204 to counteract (e.g., cancel out) any movement caused by movement of the rack bar to maintain a desired RWA position.

The system 200 (e.g., one or more sensors, the controller 208, etc.) is configured to measure the road disturbances causing movement of the rack bar and transmit a signal (e.g., an emulation signal) indicative of the disturbances to a handwheel actuator (HWA) 216. Since the dithering signal affects rack force estimation, the dithering signal may be removed from an observed rack force prior to being trans- mitted to the HWA 216 for emulation.

The HWA 216 is configured to emulate the road distur- bances as indicated by the emulation signal. Movement of the HWA 216 is transferred to a handwheel 220 (and, therefore, conveyed to the driver). In other words, the HWA 216 is configured to actuate the handwheel 220 in a manner that emulates road disturbances, while the controller 208 controls the RWA 204 to prevent the road disturbances from actually affecting movement of the road wheels. Accord- ingly, the system 200 according to the principles of the present disclosure is configured to convey road disturbances and other road "feel" components to the driver that are typically not conveyed in SbW systems In some examples, the controller 208 may be further configured to apply a dithering signal to the HWA 216 and/or other actuators or motors of the system 200. For example, it may not be desirable for some types of road or vehicle disturbances to be transferred to the handwheel 220 and felt by the driver. In contrast to the dithering signal applied to the RWA 204, the dithering signal applied to the HWA 216 may be configured to reduce or eliminate the effects of these disturbances such that these disturbances are not conveyed to the driver via the handwheel 220. For example, the system 200 may be configured to sense/measure periodic or repeated disturbances (such as those caused by road shake) frequency and amplitude of the dithering signal applied to the HWA 216 may be dynamically adjusted based on the sensed disturbances. In some examples, such a dithering signal may be applied to the HWA 216 in addition to the emulation signal described above. In this manner, the effects of some road and/or mechanical disturbances may be reduced or eliminated why other road disturbances or fea- tures ("desirable" road feel features) are conveyed to the driver by (i) applying the dithering signal to the RWA 204 to overcome static friction, (ii) sensing or measuring the road disturbances via movement of the road wheels transferred to the RWA 204, and (iii) generating and providing an emula- tion signal based on the measured road disturbances to the HWA 216.

Figure 3:
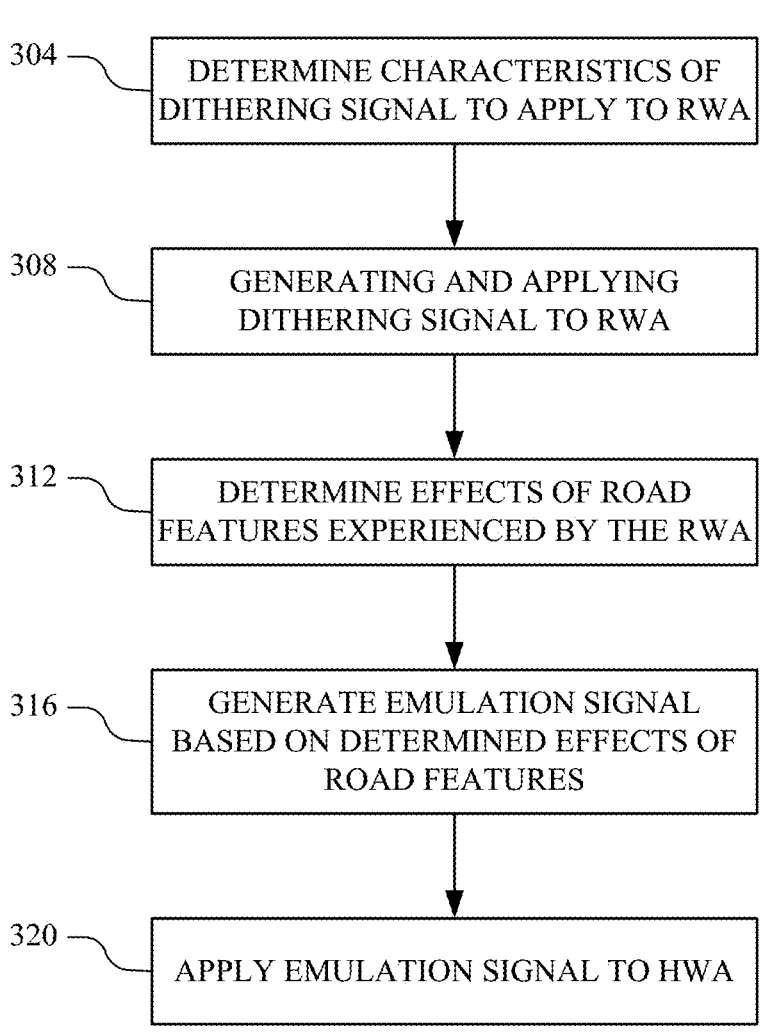
FIG. 3 is a flow diagram generally illustrating a method for controlling a road wheel actuator according to the principles of the present disclosure.

FIG. 3 is a flow diagram generally illustrating method 300 for controlling an RWA according to the principles of the present disclosure. For example, one or more computing devices, processors or processing devices, etc. are config- ured to execute instructions to implement the method 300, such as one or more of the processors of the systems described herein (e.g., a computing device or processor of a vehicle configured to implement the controller 100, the controller 208, etc.). One or more of the steps of the method 300 as described below may be skipped or omitted in some examples, and/or one or more of the steps may be performed in a different sequence than described.

At 304, the method 300 includes determining character- istics of a dithering signal to apply to the RWA. For example, determining the characteristics may include obtaining fre- quency and amplitude values for the dithering signal. The frequency and amplitude values may be obtained by deter- mining static friction associated with the RWA and/or other components of the steering system including any compo- nents mechanically coupled to and/or between the road wheels and the RWA. As one example, the static friction corresponds at least in part to static friction associated with movement of the rack bar. As an example, during a calibration process, the frequency is selected to be as high as possible without creating an audible noise (e.g., noise levels below a threshold, which may be selected based on human hearing capabilities), while the amplitude is selected to be as high as possible while little to no motion of the rack bar.

At 308, the method 300 includes generating and applying the dithering signal to the RWA, in accordance with the obtained frequency and amplitude, during operation of the vehicle. In an example, the dithering signal is continuously applied to the RWA. The dithering signal is applied along with (e.g., overlaid upon) a motor torque command signal used to control the RWA.

At 312, the method 300 includes determining (e.g., mea- suring, sensing, etc.) effects of "desirable" road disturbances or features experienced by the RWA. For example, with the static friction of the RWA reduced or eliminated by the dithering signal, various road features may cause movement of the RWA and/or associated components, such as the rack bar, which may be sensed or measured by various sensors.

At 316, the method 300 includes generating an emulation signal based on the determined effects of the road distur- bances or features. At 320, the method 300 includes apply- ing the emulation signal to the HWA (e.g., overlaid upon a motor command signal applied to the HWA). In this manner, "desirable" road features are conveyed to the driver via the HWA and handwheel as described herein.

The above discussion is meant to be illustrative of the principles and various embodiments of the present inven- tion. Numerous variations and modifications will become apparent to those skilled in the art once the above disclosure is fully appreciated. It is intended that the following claims be interpreted to embrace all such variations and modifica- tions.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementa- tion" or "one implementation" throughout is not intended to mean the same embodiment or implementation unless described as such.

Implementations the systems, algorithms, methods, instructions, etc., described herein can be realized in hard- ware, software, or any combination thereof. The hardware can include, for example, computers, intellectual property (IP) cores, application-specific integrated circuits (ASICs), programmable logic arrays, optical processors, program- mable logic controllers, microcode, microcontrollers, serv- ers, microprocessors, digital signal processors, or any other suitable circuit. In the claims, the term "processor" should be understood as encompassing any of the foregoing hard- ware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for controlling a motor of a road wheel actuator (RWA) in a steer-by-wire (SbW) steering system of a vehicle, the method comprising, using one or more processing devices:
   determining a static friction associated with the SbW steering system;
   determining a frequency and an amplitude of a dithering signal based on the determined static friction;
   providing a motor torque command signal to the motor;
   providing the dithering signal to the motor, wherein the dithering signal is applied to the motor torque command signal, and wherein the dithering signal is configured to allow road disturbances to cause movement of a rack bar of the SbW steering system;
   sensing, using one or more sensors associated with the vehicle, the road disturbances; and
   generating an emulation signal based on the sensed road disturbances.

2. The method of claim 1, further comprising providing the emulation signal to a motor of a handwheel actuator (HWA).

3. The method of claim 2, wherein the emulation signal is generated to cause the HWA to move a handwheel of the vehicle in accordance with the sensed road disturbances.

4. The method of claim 1, further comprising adjusting the motor torque command signal based on the sensed road disturbances.

5. The method of claim 1, further comprising determining the frequency and the amplitude such that the frequency does not cause audible noise and the amplitude does not cause motion of the rack bar.

6. The method of claim 1, further comprising providing a second dithering signal to a motor of a handwheel actuator.

7. The method of claim 1, wherein the dithering signal includes at least one of a periodic waveform, a square wave, a triangle wave, and a sine wave.

8. The method of claim 1, wherein the dithering signal is configured to minimize static friction associated with the SbW steering system without causing audible noise or causing motion of the rack bar.

9. A system for controlling a motor of a road wheel actuator (RWA) in a steer-by-wire (SbW) steering system of a vehicle, the system comprising:
   sensors configured to sense a plurality of values corresponding to operation of the SbW steering system; and
   a steering system controller configured to, based on the sensed plurality of values,
   determine a static friction associated with the SbW steering system,
      determine a frequency and an amplitude of a dithering signal based on the determined static friction,
      provide a motor torque command signal to the motor,
      provide a dithering signal to the motor, wherein the dithering signal is applied to the motor torque command signal, and wherein the dithering signal is configured to allow road disturbances to cause movement of a rack bar of the SbW steering system,
      sense the road disturbances, and
      generate an emulation signal based on the sensed road disturbances.

10. The system of claim 9, wherein the steering system controller is further configured to provide the emulation signal to a motor of a handwheel actuator (HWA).

11. The system of claim 10, wherein the emulation signal is configured to cause the HWA to move a handwheel of the vehicle in accordance with the sensed road disturbances.

12. The system of claim 9, wherein the steering system controller is further configured to adjust the motor torque command signal based on the sensed road disturbances.

13. The system of claim 9, wherein the steering system controller is further configured to determine the frequency and the amplitude such that the frequency does not cause audible noise and the amplitude does not cause motion of the rack bar.

14. The system of claim 9, wherein the steering system controller is further configured to provide a second dithering signal to a motor of a handwheel actuator.

15. The system of claim 9, wherein the dithering signal includes at least one of a periodic waveform, a square wave, a triangle wave, and a sine wave.

16. A processor configured to execute instructions stored in memory, wherein executing the instructions causes the processor to control a motor of a road wheel actuator (RWA) in a steer-by-wire (SbW) steering system of a vehicle, the instructions comprising:
   determining a static friction associated with the SbW steering system;
   determining a frequency and an amplitude of a dithering signal based on the determined static friction;
   providing a motor torque command signal to the motor;

US 12,698,032 B2

11 providing a dithering signal to the motor, wherein the dithering signal is applied to the motor torque command signal, and wherein the dithering signal is configured to allow road disturbances to cause movement of a rack bar of the SbW steering system;

sensing the road disturbances; and generating an emulation signal based on the sensed road disturbances.

17. The processor of claim 16, the instructions further comprising providing the emulation signal to a motor of a handwheel actuator (HWA), wherein the emulation signal is generated to cause the HWA to move a handwheel of the vehicle in accordance with the sensed road disturbances.

18. The processor of claim 16, the instructions further comprising adjusting the motor torque command signal based on the sensed road disturbances.

*     *     *     *     *